March 7, 1933.  E. L. SUTTER  1,900,745
PROGRESSIVE DISTRIBUTING LUBRICATOR
Filed Dec. 26, 1929  2 Sheets-Sheet 1
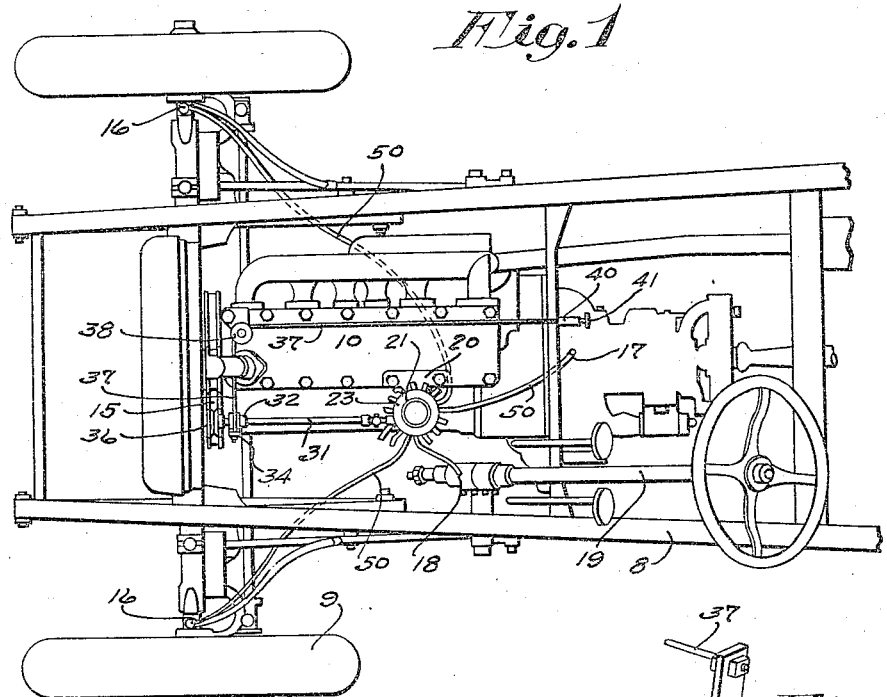
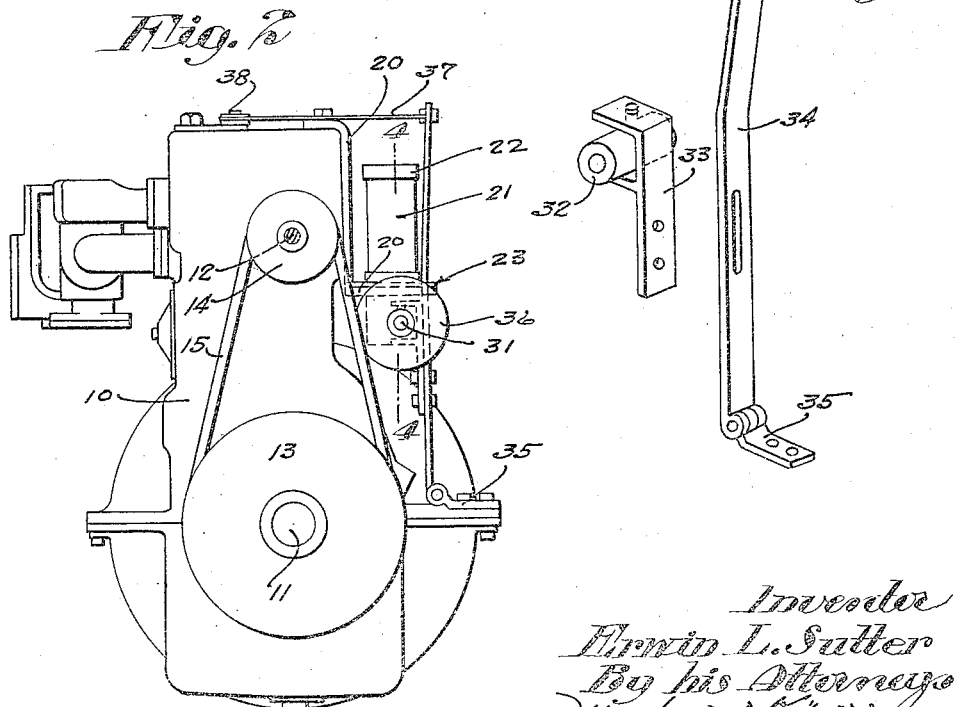

March 7, 1933.  E. L. SUTTER  1,900,745
PROGRESSIVE DISTRIBUTING LUBRICATOR
Filed Dec. 26, 1929  2 Sheets-Sheet 2
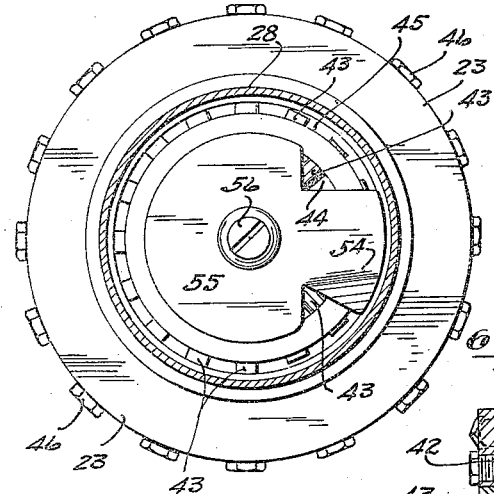
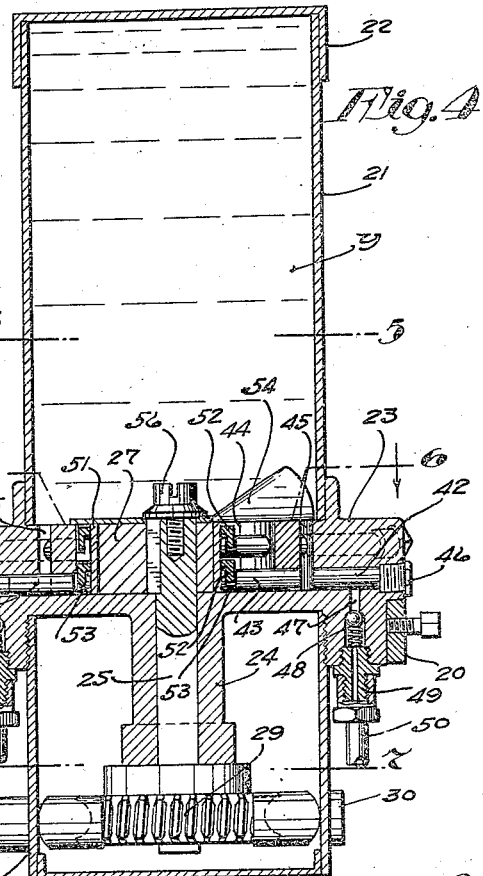
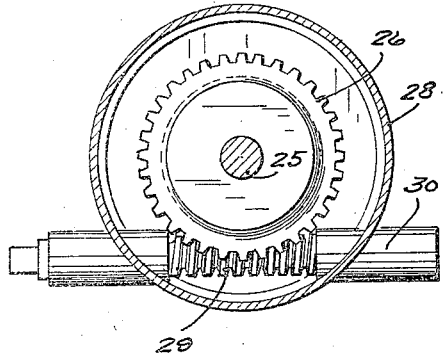
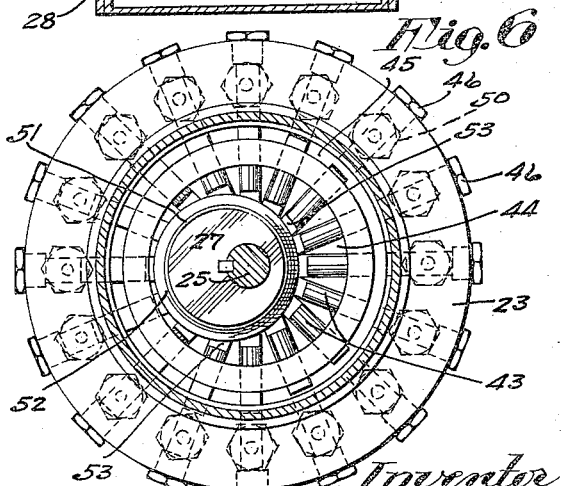

Patented Mar. 7, 1933

1,900,745

UNITED STATES PATENT OFFICE

ERWIN L. SUTTER, OF ST. PAUL, MINNESOTA, ASSIGNOR TO SUKETE INVESTMENT COMPANY, OF ST. PAUL, MINNESOTA, A CORPORATION OF MINNESOTA

PROGRESSIVE DISTRIBUTING LUBRICATOR

Application filed December 26, 1929. Serial No. 416,485.

My present invention provides a simple and highly efficient progressive distributing lubricator or lubricating apparatus, that is, a lubricating apparatus having conduits for distribution to a plurality of bearings or parts to be lubricated, and a plurality of high pressure grease-ejecting guns or devices, and means for throwing the said means or grease-ejecting devices progressively into action.

Generally stated, the invention consists of the novel devices and combinations of devices hereinafter described and defined in the claims.

In the preferred form of this improved lubricator, the grease guns are assembled in radial arrangement circumferentially spaced with their ejecting plungers projected inward toward a common axis and arranged to be engaged and progressively given grease-ejecting movements by a cam or eccentric mounted to rotate at the axis of the circle around which the guns are assembled. The invention also involves other highly important and novel features whereby the apparatus is especially adapted to be applied to automobiles or motor-propelled vehicles and to be operated from the motor thereof, all as will hereinafter more fully appear.

In the accompanying drawings, which illustrate the invention, like characters indicate like parts throughout the several views.

Referring to the drawings:

Fig. 1 is a plan view showing a portion of the chassis of an automobile or motor-propelled vehicle of what may be treated as substantially standard design but which may be of any design so far as this invention is concerned;

Fig. 2 is a front elevation of the motor of the vehicle illustrating the manner in which the lubricating apparatus may be applied to and operated from said motor;

Fig. 3 is a perspective showing the power-applying lever for the lubricator and main elements thereof being separated;

Fig. 4 is a vertical section taken through the lubricator on the line 4—4 of Fig. 2, showing the parts on a much larger scale than in Fig. 2;

Fig. 5 is a horizontal section taken on the line 5—5 of Fig. 4;

Fig. 6 is a horizontal section taken on the irregular line 6—6 of Fig. 4; and

Fig. 7 is a horizontal section taken on the line 7—7 of Fig. 4.

Of the parts of the automobile or motor-propelled vehicle, it is only desirable for the purposes of this case to particularly note the chassis frame 8, front wheels 9, engine or motor casing 10, engine crank shaft 11, fan shaft 12, pulley 13 on the crank shaft 11, pulley 14 on the fan shaft 12, fan belt 15, grease inlet to front wheel bearing 16, grease inlet to clutch release bearing 17, inlet to steering gear bearing 18, and steering post 19. As a convenient means for supporting the lubricator proper, a strong bracket 20 is bolted or otherwise rigidly secured to the top of the engine casing 10.

The grease or lubricant $y$ is placed in a container 21 which is preferably a cylinder provided with a removable cover 22. At its lower end, this container 21 is set into the annular flange of a bottom-forming base casting 23, which, as will presently appear, is formed with the barrel or cylinders of the plurality of circumferentially spaced radially disposed grease guns. The base 23 is provided with a centrally depending bearing sleeve 24 in which is journaled a short upright shaft 25 provided at its lower end with a worm gear 26 and provided at its upper end with a cam-acting eccentric 27, which latter, as shown, is cut directly to said shaft and is arranged to work on the recessed upper face of the base 23. Worm gear 26 works in a closed compartment formed by a cup-like lower shell 28 which, as shown, is of cylindrical form and is screwed into a depending flange of base 23. The numeral 29 indicates a worm that is journaled in bearings 30 on the shell 28 and meshes with the gear 26. Rotary motion and a power to operate the lubricator may be supplied in various different ways, but, as shown, it is arranged to be driven from the fan belt 15 through a jointed shaft 31. The front end of this shaft 31 is shown as journaled in a bearing 32 pivotally connected to a fork bracket 33 secured to a power-applying lever 34, which latter at its lower end, is pivoted to a lug 35 bolted to a flange of the motor casing 10. At its extreme front, shaft 31 is provided with a pulley 36 that is adapted to be moved into and out of engagement with the fan belt 15 under oscillatory movement of the lever 34. Lever 34 may be oscillated in various different ways but as shown such oscillatory movement may be imparted thereto through a controlling wire or connection 37 attached to the free upper end of said lever 34, passed over a guide sheave 38 on the top of the motor casing and from thence extended through a guide 40 and terminated in a hand-piece 41. Guide 40 is intended to be on the instrument board of the vehicle. Each of the several grease guns or individual grease-ejecting devices comprises a gun cylinder 42 and an ejecting plunger 43.

The outer body portion of the base 23 is of approximately the same thickness as eccentric 27 and its inner cylindrical surface 44 is concentric to the axis of shaft 25 and hence to the axis of rotation of eccentric 27, but said surface 44 is spaced considerably outward of the outermost line of movement of said eccentric. Just inside of the container 21, base 23 is formed with an annular grease-receiving channel 45 that extends to the plane of the bottom of eccentric 27 or in other words, to the top of the upper surface of the inner part of base 23. The gun cylinders 42 are formed in part in the outer and part in the inner portion of base 23 and as already indicated, they are radially disposed in respect to the axis of shaft 25 and are circumferentially spaced. To get a large number of these gun cylinders in small space, they are arranged in two radially disposed circumferentially spaced series, the one series being above the other, as shown in Fig. 4, and the cylinders of the one series are circumferentially offset in respect to the other so as to give a progressive action hereinafter described. At their outer ends, as shown, the cylinders 42 are tightly closed by plugs 46. Each cylinder 42 near its outer end is provided with a downwardly extended discharge port 47 formed in the depending annular flange of the base 23 and, as shown, equipped with a spring-pressed downwardly and outwardly opening check valve 48. Outward of the check valves 48, the ports 47 are connected, by couplings 49, to grease delivery pipes 50. These pipes 50 individually run to different bearings or parts to be lubricated. In the drawings, Fig. 1, pipes 50 are only shown as leading to the above noted grease-receiving ports 16, 17 and 18, the other pipes being broken away but the broken away pipes, it will of course be understood, also lead to other places to be lubricated.

Loosely placed around the cam-acting eccentric 27, but preferably quite closely fitting the same is a presser ring 51 that is arranged to directly engage the inner ends of plungers 43 and, as will presently appear, to force the same outward under high pressure without causing lateral friction between the ring and engaged plungers. To retract the plungers, flanged retracting rings 52, one for the lower and one for the upper series of plungers are loosely placed around the ring 51 with their depending annular flanges engaging notches 53 formed in the inner ends of said plungers, as best shown in Fig. 4.

This device is especially adapted for handling heavy grease as distinguished from oils or freely fluid greases (but may be used for the lighter lubricating materials) and hence to press the grease down into the annular channel 45 of base 23 a tamping device in the form of a cam-acting deflector 54 is provided. This deflector 54 is preferably formed by an obliquely turned portion of a disc 55 that is secured to eccentric 27 and shaft 25 by a cap nut 56 best shown in Figs. 4 and 5. Disc 55 is of segmental form and throughout its extended portion overlies the channel 45. The deflector 54 works over the channel 45 and under rotation of shaft 25 and eccentric 27 presses the grease down into the channel 45.

*Operation*

Briefly summarized the operation of the lubricator is as follows:

When hand-piece 41 is pulled rearward, it draws on cable 37 causing lever 34 to move sheave 36 into tight frictional contact with fan belt 15, thereby causing shaft 31 and worm 29 to be rotated at quite high speed, and worm gear 26, shaft 25 and cam-acting eccentric 27 to be rotated at relatively very slow speed. Under rotation of eccentric 27, presser ring 51 will be progressively forced against the plungers 43 and under each complete rotation of the said eccentric, each plunger will be given a complete outward and return movement. When a plunger is completely retracted, its outer end will be drawn inward of grease-receiving channel 45, as shown at the right in Fig. 4, and when it is moved outward to extreme position, its outer end will be forced into the outer section of the co-operating cylinder and will closely approach the co-operating grease discharge port 47. As already described, the tamper or deflector 54 will keep channel 45 well filled with grease so that when a plunger makes its outward movement, it will force grease into the outer portion of the co-operating cylinder, thus keeping the outer portion of cylinder loaded with grease and on each outward movement of the plunger casing, a discharge of grease through a co-operating port 47 under high pressure. When a plunger makes its outward movement, it will produce partial vacuum in the outer portion of its cylinder and this partial vacuum assists in keeping the outer portions of the cylinders loaded with grease. With this arrangement, the main body of grease is retained under atmospheric pressure and the grease is subjected to pressure in the individual guns or grease-discharging devices only for the short intervals during which ejection of grease is produced. In this way, it is possible to eject grease under very high pressures without maintaining any quantity of grease under high pressure.

In practice it has been found that it is not only feasible but an easy matter to discharge grease through the individual grease pipes under pressures as high or higher than five thousand pounds per square inch.

When the eccentric forces presser ring 52 against the plungers, the friction between the ring and the plungers will be such that said ring will not rotate or move circumferentially in frictional contact with the engaged plungers, but the ring will simply press radially outward on the plungers and the slipping friction will take place between said ring and the eccentric where the friction is greatly distributed and where the frictional resistance will be at a minimum. This greatly relieves the plungers from lateral stress while forcing the grease under high pressure.

In fact, the presser ring 51 distributes the torque due to the action of the cam or eccentric 27 over such a large number of plungers that no one plunger is subjected to any considerable lateral stress. The said presser ring has a sort of rolling action against the inner ends of the plungers and, of course, does not rotate with the eccentric, but the eccentric rotates within the said presser ring. In practice, it has been found that the direct action of a cam or eccentric on the inner ends of the plungers in an arrangement similar to that illustrated, produces such intense lateral stress in the plungers that such a device is not practically operative and it can never be used to discharge grease under very high pressures.

The maximum grease discharge takes place progressively in the several grease pipes and the predetermined pressure is independently produced in each grease pipe. If the resistance to the discharge of grease in any particular pipe is not great, then the pressure produced will not necessarily be great, but if the resistance to the discharge of grease in any pipe or conduit is very high, then the resistance will be overcome by the very high pressure that will be produced in any grease delivery gun or device when resistance to discharge is offered. The operator can keep the lubricating device in operation as long as he pleases so as to repeat the oil delivery impulses in the several grease pipes as many times as thought desirable and, of course, with the arrangement described, the lubricator will go out of action whenever tension on the operating cable 37 is relieved.

In some instances, it may be desirable to keep the lubricator in constant action for a very considerable period of time and to operate the same from the running vehicle, but in such instances, the speed of rotation of the eccentric 27 would have to be geared down to a very much greater extent than illustrated in the drawings. From what has been said, it will, of course, be understood that the lubricator here illustrated and described more or less in detail is capable of a large range of modification all within the scope of the invention herein broadly disclosed and claimed.

What I claim is:

1. A lubricator comprising a body formed with circumferentially spaced radially disposed gun cylinders having grease intake passages, grease discharge plungers working in said cylinders, a presser ring having rolling engagement with said plungers, and a rotary cam-acting gun-actuating element rotatable within and operative on said presser ring.

2. A lubricator comprising a body formed with circumferentially spaced radially disposed gun cylinders having grease intake passages, grease discharge plungers working in said cylinders, a presser ring having rolling engagement with said plungers, a rotary cam-acting gun-actuating element rotatable within and operative on said presser ring, and means for retracting the plungers following grease-ejecting movements.

3. A lubricator comprising a body formed with circumferentially spaced radially disposed gun cylinders having grease intake passages, grease discharge plungers working in said cylinders, a presser ring having rolling engagement with said plungers, a rotary cam-acting gun-actuating element rotatable within and operative on said presser ring, and means carried by said presser ring operative to retract said plungers to positions to open the grease intake passages to said gun cylinders.

4. A lubricator comprising a body formed with circumferentially spaced radially disposed gun cylinders having grease intake passages, grease discharge plungers working in said cylinders, a presser ring having rolling engagement with said plungers, a rotary cam-acting gun-actuating element rotatable within and operative on said presser ring, and a plunger retracting ring carried loosely by said presser ring and operative to impart positive retracting movements to the plungers.

5. A lubricator comprising a body formed with circumferentially spaced radially disposed gun cylinders having grease intake passages, grease discharge plungers working in said cylinders, a presser ring having rolling engagement with said plungers, a rotary cam-acting gun-actuating element rotatable within and operative on said presser ring and operative to impart positive retracting movements to the plungers but being inoperative thereon during grease-discharging movements thereof.

6. A lubricator comprising a body formed with circumferentially spaced radially disposed gun cylinders arranged in upper and lower series with the cylinders of the one series vertically staggered in respect to the cylinders of the lower series so that in a circumferential direction the cylinders of the one series will be positioned circumferentially between cylinders of the other series, said cylinders having grease intake passages and grease discharge passages, plungers working in said cylinders, presser rings operative on and having rolling engagement with the plungers of the upper and lower cylinders to impart grease-ejecting movements to said plungers, and a rotary cam-acting gun-actuating element rotatable within and operative on said presser ring to impart progressive grease-ejecting movements to the plungers of said upper and lower cylinders.

7. A lubricator comprising a body formed with circumferentially spaced radially disposed gun cylinders arranged in upper and lower series with the cylinders of the one series vertically staggered in respect to the cylinders of the lower series so that in a circumferential direction the cylinders of the one series will be positioned circumferentially between cylinders of the other series, said cylinders having grease intake passages and grease discharge passages, plungers working in said cylinders, presser rings operative on and having rolling engagement with the plungers of the upper and lower cylinders to impart grease-ejecting movements to said plungers, a rotary cam-acting gun-actuating element rotatable within and operative on said presser ring to impart progressive grease-ejecting movements to the plungers of said upper and lower cylinders, and means carried by said presser ring and operative on the plungers of said upper and lower cylinders to retract the same to positions to open their grease-intake passages.

8. A lubricator comprising a body formed with circumferentially spaced radially disposed gun cylinders arranged in upper and lower series with the cylinders of the one series vertically staggered in respect to the cylinders of the lower series so that in a circumferential direction the cylinders of the one series will be positioned circumferentially between cylinders of the other series, said cylinders having grease intake passages and grease discharge passages, plungers working in said cylinders, a loose presser ring operative on and having rolling engagement with the plungers of the upper and lower cylinders to impart grease-ejecting movements to said plungers, a rotary cam-acting gun-actuating element rotatable within and operative on said presser ring to impart progressive grease-ejecting movements to the plungers of said upper and lower cylinders, and plunger retracting rings carried by said presser ring and each thereof being operative on one series of plungers to impart positive retracting movements thereto.

9. A lubricator comprising a body formed with circumferentially spaced radially disposed gun cylinders arranged in upper and lower series with the cylinders of the one series vertically staggered in respect to the cylinders of the lower series so that in circumferential direction the cylinders of the one series will be positioned circumferentially between cylinders of the other series, said cylinders having grease intake passages and grease discharge passages, plungers working in said cylinders, a loose presser ring operative on and having rolling engagement with the plungers of the upper and lower cylinders to impart grease-ejecting movements to said plungers, a rotary cam-acting gun-actuating element rotatable within and operative on said presser ring to impart progressive grease-ejecting movements to the plungers of said upper and lower cylinders, and plunger retracting rings loosely carried by said presser ring and each thereof being operative on one series of plungers to impart positive retracting movements thereto.

10. A lubricator comprising a body formed with circumferentially spaced radially disposed gun cylinders arranged in upper and lower series with the cylinders of the one series vertically staggered in respect to the cylinders of the lower series so that in a circumferential direction the cylinders of the one series will be positioned circumferentially between cylinders of the other series, said cylinders having grease-intake passages and grease discharge passages, plungers working in said cylinders, a loose presser ring operative on and having rolling engagement with the plungers of the upper and lower cylinders to impart grease-ejecting movements to said plungers, a rotary cam-acting gun-actuating element rotatable within and operative on said presser ring to impart progressive grease-ejecting movements to the plungers of said upper and lower cylinders, notches in the inner end portions of each of said plungers, and retracting rings carried by said presser ring and each thereof being arranged to work in the notches of one series of plungers and operative to impart positive retracting movements to said plungers.

11. The structure defined in claim 10 in which the presser ring is engageable only with the inner ends of the plungers for imparting grease-ejecting movements thereto and in which said retracting rings work with axial clearance in the notches in their respective cooperating plungers and are operatively engageable with only the rear ends of the said notches for imparting retracting movements to the plungers.

In testimony whereof I affix my signature.

ERWIN L. SUTTER.